May 28, 1957  L. H. GERMAINE  2,794,082
AUTOMOTIVE SIGNALLING SYSTEM
Filed March 2, 1953  2 Sheets-Sheet 1

INVENTOR.
LOUIS H. GERMAINE
BY
Charles S. Penfold
ATTORNEY

May 28, 1957 L. H. GERMAINE 2,794,082
AUTOMOTIVE SIGNALLING SYSTEM
Filed March 2, 1953 2 Sheets-Sheet 2

INVENTOR.
LOUIS H. GERMAINE
BY
Charles S. Penfold
ATTORNEY

United States Patent Office 2,794,082
Patented May 28, 1957

2,794,082

AUTOMOTIVE SIGNALLING SYSTEM

Louis H. Germaine, Logansport, Ind.

Application March 2, 1953, Serial No. 339,590

5 Claims. (Cl. 200—52)

The invention relates generally to means for producing a signal and is primarily directed to an electrical signalling system and apparatus which is adapted for use in an automotive vehicle and controlled by the brake pedal or lever.

The principal object of the invention is to provide an improved signalling system and apparatus which is preferably operatively connected with the conventional stop lights in a manner whereby the driver or occupant of a car can determine to some extent the rate of speed that a car ahead is travelling when its brakes are applied. More particularly, the invention affords an arrangement which enables the driver of a car following a car ahead to know whether the operator of the forward car is reducing his speed gradually or suddenly, or is applying just sufficient pressure to the brake pedal or lever to energize the stop lights.

An important object of the invention is to provide novel apparatus for producing signals which embodies improved principles of design and construction and which can be manufactured and sold as an original equipment item or as an accessory which lends itself to easy and quick installation on any of the cars and trucks now in use. The apparatus or mechanism for producing the signal is of such a character that it can be readily incorporated with any conventional speedometer device and stop light circuit, or if desired, can be hooked up with one or a pair of separate lamps.

A particular object of the invention is to provide a device or control comprising, among other things, actuating means connectible to a speedometer cable, a pair of lamps or signals, and a relay switch operated by the opening and closing of the contact means for alternately illuminating the lamps.

A significant object of the invention is to provide a setup in which the actuating means above referred to includes a cam located between the contact means for controlling their operation.

A specific object of the invention is to arrange all of the operating components of the device into a compact control unit for support on a speedometer cable.

Additional objects and advantages of the invention will become apparent after the description hereinafter set forth is considered in conjunction with the drawings annexed hereto.

In the drawings wherein two modification of the invention are illustrated:

Figures 2, 3, 4:
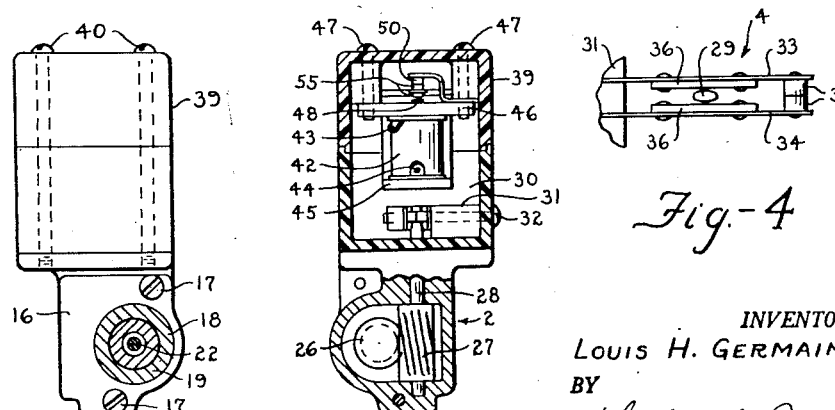
Figures 2 and 3 are transverse sectional views taken through parts of the apparatus or system.
Figure 5:
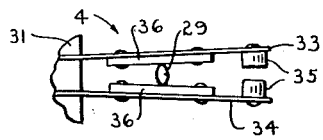
Figure 6:
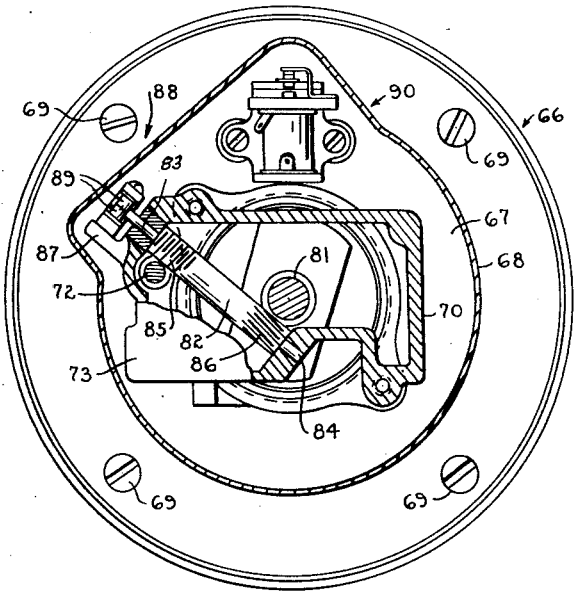
Figure 7:
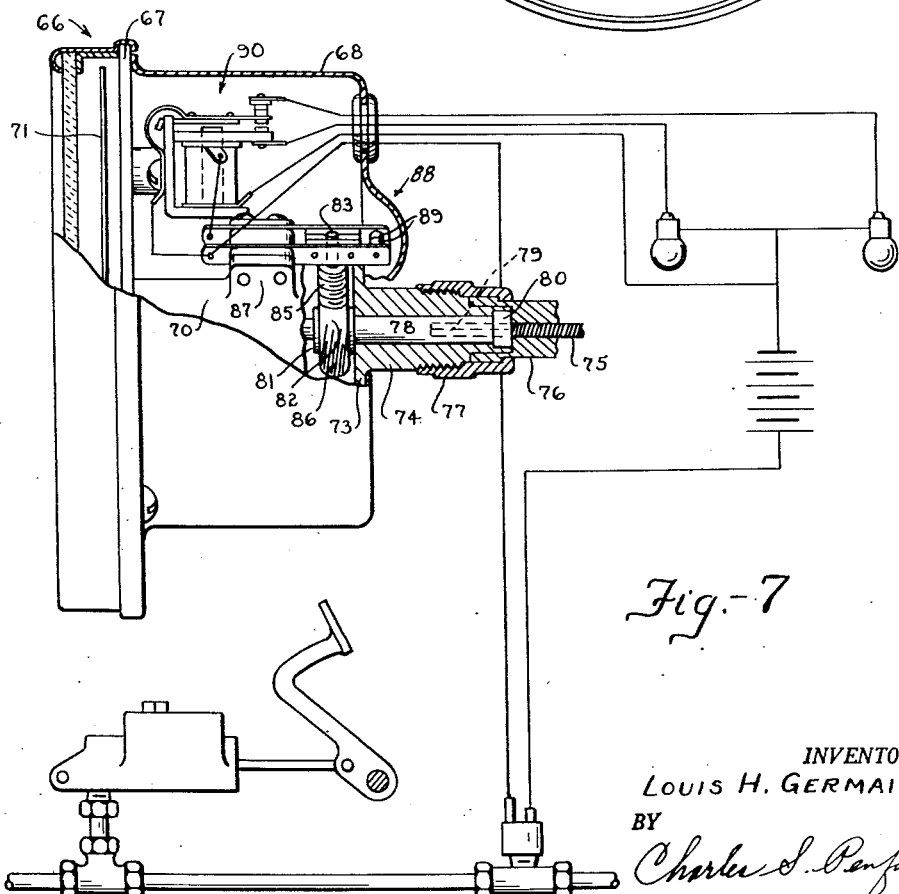

Figures 4 and 5 respectively show the open and closed position of contact means forming a part of the control unit;

Figure 6 is a transverse sectional view of a conventional speedometer device with the invention embodied therein to constitute an original equipment item; and Figure 7 is a diagrammatic or plan view of the system embodying the structure of Figure 6.

The structure designed for use as an accessory and exemplified in Figures 1 through 5 of the drawing will be described first. The components of the system as exemplified in Figure 1, among other things, includes a speedometer 1, actuating means generally designated 2, means for detachably connecting the actuating means with the speedometer 1 and a cable 3, contact means 4 and a relay switch 5 constituting components of the control unit, a pair of stop lights 6 and 7, a battery or other electrical source 8, a hydraulically operated stop light switch 9 connected in circuit with the battery, lights and components of the control unit, and a brake pedal or lever 10 which actuates the switch 9 to place the system in operation.

Figure 1:
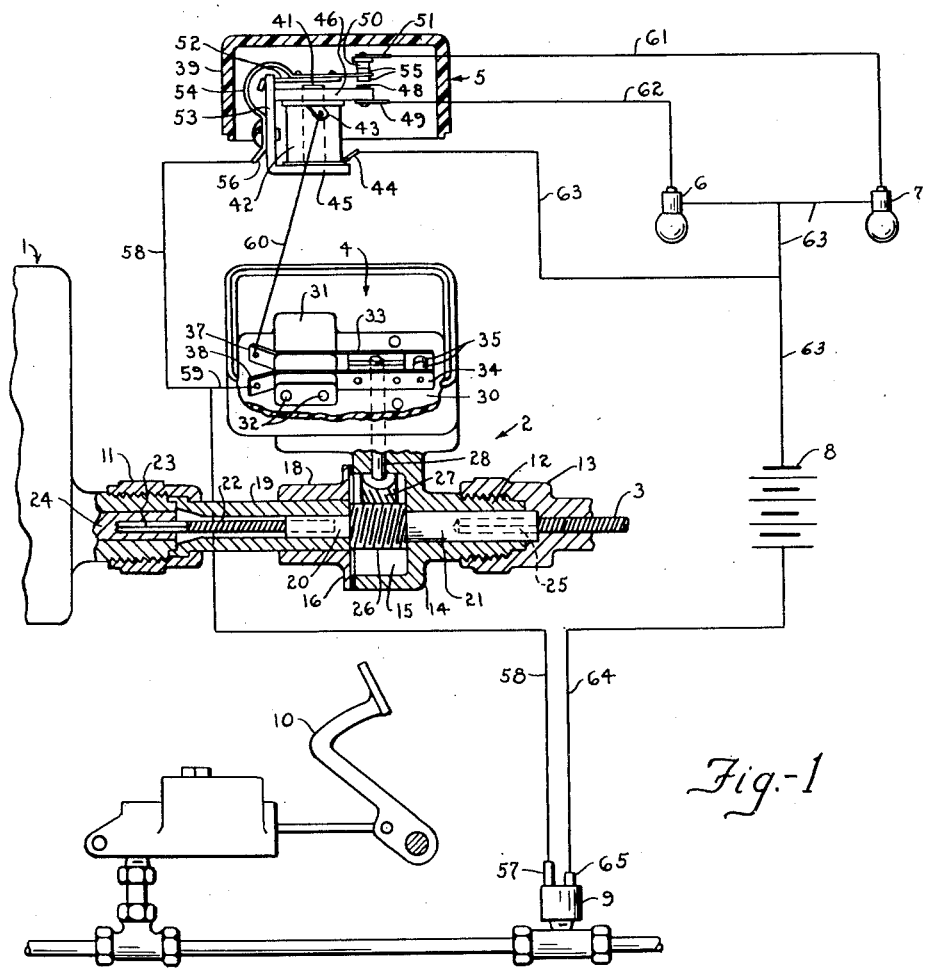
Figure 1 is a diagrammatic or plan view of the system embodying apparatus constructed as an accessory for installation in a vehicle.

The control unit is provided with a coupling 11 and an externally threaded tubular bearing 12 and the cable with a conventional coupling 13 so that the control unit can be easily and quickly connected to the speedometer and cable by merely disconnecting the coupling 13 of the cable from the speedometer and then respectively connecting the coupling 11 and bearing 12 of the unit to the speedometer and cable as shown in Figure 1. Insofar as the subject invention is concerned, the actuating means of the control unit may be operatively connected with some other mechanism on the vehicle which moves when the vehicle is set in action.

The control unit is compact and includes a housing of insulating material within which the contact means and relay switch are disposed. A metal offset 14 is carried by the housing and this offset supports the means for detachably connecting the unit to the speedometer and cable. The offset is formed to provide a chamber 15 which is closed by a plate 16 detachably secured to the offset by screws 17 as shown in Figures 1 and 2. The offset is provided with the tubular bearing 12 above referred to and the plate 16 is provided with an integral tubular extension 18 which supports a tubular bearing 19 axially aligned with the bearing 12. The inner end of the bearing 19 is secured in the extension 18 and its outer end carries the coupling 11 for threadedly connecting the control unit for support on the speedometer 1.

A rotatable shaft element is mounted in the offset 14. This element includes a cylindrical portion 20 and a cylindrical portion 21 which is of greater length and diameter than portion 20. The smaller portion 20 is journalled in the bearing 19. The inner end of a relatively short flexible shaft 22 is anchored in the portion 20 of the shaft element and its outer end is provided with a fitting 23 which extends beyond the bearing 19 and into the coupling 11. The speedometer is provided with a rotatable member 24 having a socket therein which detachably receives the free end 23 of the shaft 22 in a manner to provide a driving connection therebetween. The larger cylindrical portion 21 extends beyond the bearing 12 and into the coupling 13 and is provided with a socket for detachably receiving a fitting 25 on the cable 3 for establishing a driving connection between the cable and rotatable element.

The rotatable element is enlarged between the cylindrical portions 20 and 21 and formed to provide a gear 26 which drives a worm gear 27 fixed on a shaft 28 arranged at right angles to the axis of the rotatable element. The shaft 28 has an inner end 29 which extends into a chamber 30 of the housing of the control unit and is preferably flattened to provide a cam which is more or less oval in cross-section as shown in Figure 4.

The shaft 28 serves to operate the contact means 4 above referred to. More particularly in this regard, the contact means 4, as clearly depicted in Figures 1, 4 and 5, among other things, includes a laminated insulating block 31 mounted in the chamber 30 by a pair of screws 32. A pair of elongated flexible members 33 and 34, insulated from one another, are secured to the block in parallel relation. Each member carries a contact 35 at its free end and a small bar of insulation 36 between the contact and block. The bars and contacts are secured to the flexible members in opposed relation and the cam 29 of the shaft 28 is disposed between the bars. The arrangement is such that the contacts will normally engage one another when the flexible members are substantially in parallel relation and the cam 29 is in the position illustrated in Figures 1 and 4. The flexible member 33 is provided with a terminal 37 and the member 34 with a terminal 38. When the shaft 28 is rotated by the cable 3 through the gears 26 and 27 of the actuating means the contacts 35 will be caused to engage and disengage to control the operation of the relay switch as will be described more fully hereinafter.

Although the various operative mechanisms are preferably arranged into a relatively compact unit it is to be understood that if found desirable the contact means, generally designated 4, may be located at some remote location or place, in which event a flexible cable would be substituted for the rotatable shaft 28. It is also to be understood that if found desirable means other than a cam may be utilized to actuate the contact means 4.

The relay switch, generally designated 5, is of the midget type and is preferably mounted in a cover 39 constituting a part of the housing for the control unit. Screws 40 may be used to detachably secure the cover in place as shown in Figure 2. This switch structure, among other things, includes a solenoid having a core 41 and a continuous coil 42 provided with terminals 43 and 44. The solenoid is mounted on a leg 45 of an angular bracket. A plate 46 of insulating material is carried by the solenoid and the plate may be detachably secured to the cover by screws 47 to support the switch in the cover as shown in Figure 3. If found desirable, the bracket in lieu of the plate may be directly attached to the cover or the housing. A hole is provided in the plate through which the core 41 extends. The plate supports a lower stationary contact 48 having a terminal 49. This plate also supports an upper stationary contact 50 spaced and insulated from contact 49 and having a terminal 51. An armature 52 is held in pivotal relationship to the other leg 53 of the bracket by a generally L-shaped spring 54 which has one extremity secured to the leg 45 and its other extremity to the armature 52. The spring is formed with an extension to yieldably support a contact 55 between the stationary contacts and normally holds the contact means 55 engaged with upper contact 50 as shown in Figure 1. The spring is provided with a terminal 56. With this arrangement, current flowing through the coil will magnetize the core and pull the armature downwardly to cause the yieldably supported or movable contact 55 to move away from the upper stationary contact 50 and engage the lower stationary contact 48 and when the flow of current is interrupted, the movable contact will automatically return into engagement with the upper contact. This alternate engagement of the movable contact with the stationary contacts alternately illuminates the lamps to produce flashing signals.

As stated above, if found desirable the contact means 4 may be located at some desirable location remote from the actuating means. Similarly, the relay switch 5 may be located at some remote place from the contact means 4 and actuating means.

Describing the electrical hookup as clearly exemplified in Figure 1, a terminal 57 of the stop light switch 9 is connected to the terminal 56 of the spring 54 of the relay switch by a conductor 58 which in turn is connected to the terminal 38 of the contact means 4 by a conductor 59. A conductor 60 connects the terminal 37 of the contact means 4 and the terminal 43 of the solenoid coil.

The terminal 51 of the upper stationary contact 50 is connected to the stop light or lamp 7 by a conductor 61 and the terminal 49 of contact 48 is connected to the lamp 6 by a conductor 62. The terminal 44 of the solenoid coil and the lamps 6 and 7 are connected to the battery or ground by conductors 63. A conductor 64 connects the battery or source 8 with the other terminal 65 on the stop light switch 9.

The operation of the apparatus or system is relatively simple. Assuming that the stop light switch 9 is operated and the contacts 35 are separated due to the disposition of the cam 29 of the shaft as shown in Figure 5, current will flow from the battery through conductor 64, stop light switch 9, conductor 58, spring 54, contacts 55 and 50, and through conductor 61 to illuminate lamp 7. If the vehicle is set in motion, the shaft element operatively connected to the cable and speedometer will rotate the shaft 28 so that the cam and the resilient members 33 and 34 will control engagement and disengagement of the contacts 35 and in so doing, the solenoid will be energized and deenergized whereby the contact 55 moved by the armature 52 will alternately engage and disengage the stationary contacts 48 and 50 to cause the lamps to alternately illuminate or produce flashing signals. More particularly in this respect, when the contacts 35 are engaged by operation of the switch 9 current will flow from the battery through conductor 64, switch 9, conductor 58, conductor 49, contacts 35, conductor 60, coil 42 and back to battery through conductor 63, which will magnetize the core 41 to pull the armature 52 down and the contact 55 away from the upper contact 50 and into engagement with the lower contact 48 to illuminate the lamp 6. When the contacts 35 are disengaged the coil 42 will be deenergized, in which event, the armature will swing upwardly through the agency of the spring 54 to return the contact 55 back into engagement with the upper contact 50. In view of the foregoing, it will be manifest that movement of the contact 55 of the relay switch generally designated 5 is under the direct control of the contact means generally designated 4 and that the frequency of the operation of the contact means 4 is determined by the speed of the vehicle through the rotatable shaft element connected to the cable 3.

In view of the foregoing it will be manifest that the speed of the vehicle determines the frequency of the operation of the contact means generally designated 4, and since this contact means determines the frequency of the operation of the contact 55 relative to the stationary contacts 48 and 50, it necessarily follows that the lamps will be alternately illuminated in accordance with the spread of the vehicle. The greater the rate of speed, the greater the frequency of the alternate flashing of the lamps. Thus, one following a car ahead will know whether the operator of the forward car is reducing his speed gradually or suddenly, or is applying just sufficient pressure to the brake pedal to energize the lamps.

As pointed out above, the invention may be designed and constructed for use as an original equipment item, and to this end Figures 6 and 7 of the drawing exemplify the control unit embodied in a speedometer, which will now be described.

The structure shown in Figures 6 and 7, among other things, includes a speedometer generally designated 66 having a back plate 67 and a cup-like shell 68 extends rearwardly from the plate and is secured thereto by screws 69. The shell covers certain of the mechanisms of the control unit. As clearly illustrated, a metal housing 70 is also secured to the back plate 67. A conventional needle or pointer 71 indicates on a dial carried by the front side of the plate the speed of the vehicle. A gear 72 drives a counter mechanism. The counter mechanism and the shaft carrying the gear 72 are not shown. The housing is provided with a rear wall 73 having a tubular externally threaded bearing 74 which projects rearwardly through the bottom wall of the shell 68. A cable 75 is provided with a fitting 76 which carries a coupling 77 which, in turn, engages the threads on the bearing 74 for attaching the cable to the control unit. A shaft 78 is journalled in the bearing and its outer end is provided with a socket for detachably receiving the squared inner end 79 of the cable in a manner to drive the shaft. The cable is preferably provided with a collar 80 for locating its inner end and reenforcing the connection. A gear 81 is fixed on the inner end of the shaft 78. An intermediate shaft 82 is also rotatably mounted in the housing. This shaft is provided with reduced extensions 83 and 84 which are journalled in the walls of the housing in a manner to locate the shaft transversely to the longitudinal axis of the shaft 78. This intermediate shaft is provided with gears 85 and 86 which respectively mesh with the gears 72 and 81. Thus, rotation of the cable will rotate the shaft 82.

The housing 69 is provided with an offset 87. As clearly depicted, the extension 83 of the shaft is of a greater length than extension 84 and projects outwardly from a wall of the housing for disposition with respect to contact means, generally designated 88, carried by the offset 87. More specifically in this regard, the longer extension 83 is provided with a cam, corresponding to the cam 29 above referred to, which is disposed between a pair of corresponding resiliently supported contacts 89 which are actuated by the cam for controlling their engagement and disengagement to operate a relay switch, generally designated 90, mounted on the back plate 67 of the speedometer. The relay switch and remaining components of the structure exemplified correspond in structure and function to the accessory referred to above so additional description is not deemed essential.

The original equipment setup just described offers certain advantages because all that has to be added to a conventional speedometer is the extension 83 on the shaft 82, contact means 88, relay switch 90, and some conductors to produce an operative signalling system or apparatus, the initial cost of which is nominal when compared with the results obtained.

Having thus described my invention, it is obvious that various other modifications may be made in the same without departing from the spirit of my invention; hence I do not wish to be understood as limiting myself to the exact forms, constructions, arrangements and combinations of parts herein shown and described or uses mentioned.

I claim:

1. Apparatus adapted for use in the signalling system of an automotive vehicle comprising a housing, spaced aligned bearing means provided on the housing, a rotatable element journalled in the bearing means and having means for detachable connection with a rotatable member of a speedometer mechanism and means for detachable connection with a speedometer cable, a pair of yieldable contact means carried by the housing, a shaft journalled substantially within the confines of the housing, a gear provided on the rotatable element and a gear provided on the shaft meshing with the gear on the rotatable element in a manner whereby the cable will drive the shaft, and said shaft having a reduced extremity normally disposed for rotation between the yieldable contact means for causing disengagement and permitting engagement of said contact means.

2. Apparatus adapted for use in the signalling system of an automotive vehicle comprising a housing, spaced aligned bearing means provided on the housing, a rotatable element journalled in the bearing means and having means for detachable connection with a rotatable member of a speedometer mechanism and a speedometer cable, spaced contact means, a shaft journalled in the housing, means operatively connecting the shaft and the rotatable element in a manner whereby the cable will drive the shaft, means provided on the shaft rotatable between the contact means for operating the contact means, a pair of stationary contacts and a movable contact, and means controlled by the contact means for moving the movable contact alternately into engagement with the stationary contacts.

3. A device of the kind described comprising a housing, a primary shaft journalled in the housing for connection with a speedometer cable, said housing having a pair of opposed walls, a secondary shaft having portions journalled in said walls and driven by said primary shaft, said housing being provided with an exterior offset, a pair of elongated yieldable members having ends secured to the offset and free ends provided with contacts, an insulator carried by each of the members, and said secondary shaft also having a portion disposed exteriorly of the housing and normally between and engaging the insulators for controlling the engagement and disengagement of the contacts.

4. The structure defined in claim 2, including a conductor connecting one of the spaced contact means with the movable contact, a conductor connecting the other of the spaced contact means with the controlled means, and conductors for connecting said other spaced contact means and said controlled means with a source of electricity.

5. The structure defined in claim 2, in which the means affording a detachable connection between the rotatable element with the rotatable member of the speedometer mechanism includes an elongated flexible component operatively connecting the element and mechanism.

References Cited in the file of this patent

UNITED STATES PATENTS

| | | |
|---|---|---|
| 1,305,649 | Freytag | June 3, 1919 |
| 1,570,673 | Johns | Feb. 12, 1923 |
| 1,620,959 | Gobos | Mar. 14, 1927 |
| 1,655,787 | Harris | Jan. 10, 1928 |
| 1,959,634 | Mickle | May 22, 1934 |
| 1,997,943 | Moeller | Apr. 16, 1935 |
| 2,122,248 | Demas | June 28, 1938 |
| 2,143,550 | Gilbert | Jan. 10, 1939 |
| 2,462,655 | McHenry | Feb. 22, 1949 |
| 2,486,864 | Mitchell | Nov. 1, 1949 |
| 2,609,463 | Hassan | Sept. 2, 1952 |
| 2,655,642 | Ayres | Oct. 13, 1953 |

FOREIGN PATENTS

| | | |
|---|---|---|
| 109,603 | Sweden | Jan. 24, 1944 |
| 142,575 | Switzerland | Jan. 2, 1931 |